C. E. LARRABEE.
TIME RECORDER.
APPLICATION FILED SEPT. 10, 1908.

935,312.

Patented Sept. 28, 1909.
8 SHEETS—SHEET 1.

Fig. 1

WITNESSES:
A. C. Mahan
A. A. Dunham

INVENTOR
C. E. Larrabee
BY
Kerr, Page, Cooper & Hayward
ATTORNEYS

C. E. LARRABEE.
TIME RECORDER.
APPLICATION FILED SEPT. 10, 1908.

935,312.

Patented Sept. 28, 1909.
8 SHEETS—SHEET 3.

WITNESSES:
A. E. Mahan
L. L. Dunham

INVENTOR
C. E. Larrabee
BY
Kerr, Page, Cooper & Hayward
ATTORNEYS

C. E. LARRABEE.
TIME RECORDER.
APPLICATION FILED SEPT. 10, 1908.

935,312.

Patented Sept. 28, 1909.
8 SHEETS—SHEET 6.

WITNESSES:
A. C. Mahan
H. H. Dunham

INVENTOR
C. E. Larrabee
BY
Kerr, Page, Cooper & Hayward
ATTORNEYS

C. E. LARRABEE.
TIME RECORDER.
APPLICATION FILED SEPT. 10, 1908.

935,312.

Patented Sept. 28, 1909.
8 SHEETS—SHEET 7.

WITNESSES:
A. E. Mahan
A. L. Dunham

INVENTOR
C. E. Larrabee
BY
Kerr, Page, Cooper & Hayward
ATTORNEYS

C. E. LARRABEE.
TIME RECORDER.
APPLICATION FILED SEPT. 10, 1908.

935,312.

Patented Sept. 28, 1909.
8 SHEETS—SHEET 8.

WITNESSES:
A. E. Mahan
J. S. Dunham

INVENTOR
C. E. Larrabee
BY
Kerr, Page, Cooper & Hayward
ATTORNEYS

UNITED STATES PATENT OFFICE.

CLINTON E. LARRABEE, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK.

TIME-RECORDER.

935,312.   Specification of Letters Patent.   Patented Sept. 28, 1909.

Application filed September 10, 1908. Serial No. 452,422.

*To all whom it may concern:*

Be it known that I, CLINTON E. LARRABEE, a citizen of the United States, residing at Binghamton, in the county of Broome and State of New York, have invented certain new and useful Improvements in Time-Recorders, of which the following is a specification, reference being had to the drawings accompanying and forming part of the same.

In time recorders it is customary to make the device which supports or carries the record sheet movable in two directions, usually laterally and vertically, to permit of various spaces on the sheet being brought to the printing point. Thus movement in one direction, say laterally, will bring successive portions of the same horizontal line to the impression point, so as to record the times of a workman's arrival and departure on a given day, while movement vertically will bring successive horizontal lines to the printing position to provide for the records of different days.

Heretofore it has been customary to put the vertical movement, or, in general, the movement which brings different day-lines to the printing position, under the control of the clock, so that the change will be made automatically each day.

My present invention also relates to the adjustment of the record-sheet carrier or support, and while the invention may be employed to bring the day-lines or columns to the impression position it is intended more particularly to provide for the adjustment of the carrier or support to bring different portions of the day-line into operative relation to the printing devices.

The chief object of the invention is to provide simple and reliable means, actuated by or under the control of the clock, for effecting the lateral shift or adjustment of the record-sheet support or carrier, to bring to the printing position different portions of a horizontal line, for recording the times of arrival and departure, or the "In" and "Out", to use the common terminology.

A further object is to provide manually operated means whereby the lateral adjustment can be effected at will independently of the automatic or clock-controlled feature, to provide for irregular registrations, as a very late arrival or early departure.

To these and other ends the invention consists in the novel features of construction, arrangements of parts, and combinations of elements, hereinafter described, and more particularly set forth in the claims.

While the invention is applicable to time recorders of various types I have selected for illustration and specific description herein an embodiment in which the invention is applied to a recorder of the so-called "card type", as exhibiting the various features of the improvement in convenient and effective form.

In the type of recorder just referred to, the time-records are kept on cards, one for each workman, on which spaces are provided for different days and for the different times of arrival and departure on each day. The recorder has a card-receiver or chute into which the workman inserts his card before actuating the manual lever which causes the printing to be effected, and means under the control of the clock for varying each day the depth to which the card can be inserted in the receiver or chute. Thus the card, sinking to a new depth each day, presents each day a new horizontal line to the printing position. Means are also provided for shifting the receiver or chute laterally, to bring the different arrival and departure, or "In" and "Out", spaces to the impression point. In time-recorders of the type thus briefly outlined my present invention is designed primarily to effect this lateral shifting or adjustment of the card-receiver.

Referring now to the annexed drawings.

Figure 2:
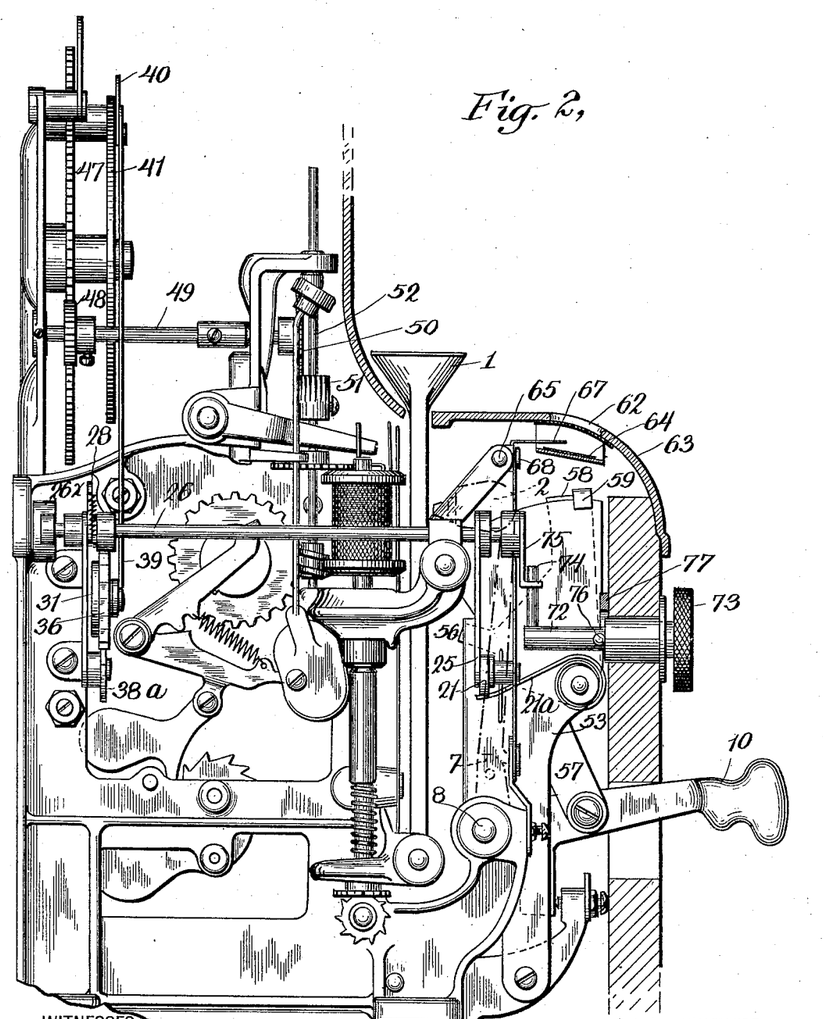
Fig. 2 is a side view of the same, but showing a portion of the casing.
Figure 3:
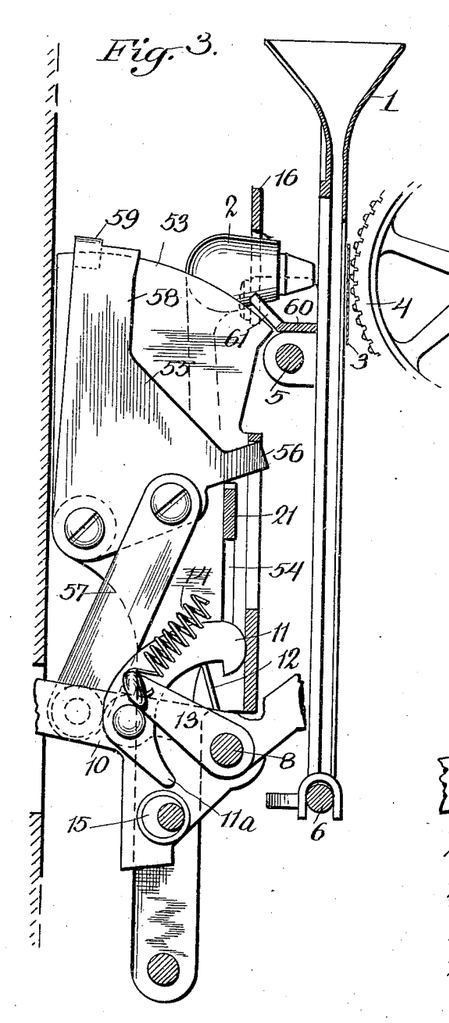
Figs. 3 and 4 are detail side views showing different operative positions of certain parts of the apparatus.

The card receiver, designated by 1, is open at the top to receive the card, and has its central portion open to permit the printing hammer 2, (Figs. 2 and 3, to carry the card rearward against the ink-ribbon 3 and the time-printing wheels indicated by 4. The receiver is mounted to slide laterally on rails 5, 6, and means (not shown) are usually provided to limit the depth of insertion of the record card, for the purposes before mentioned.

Figure 1:
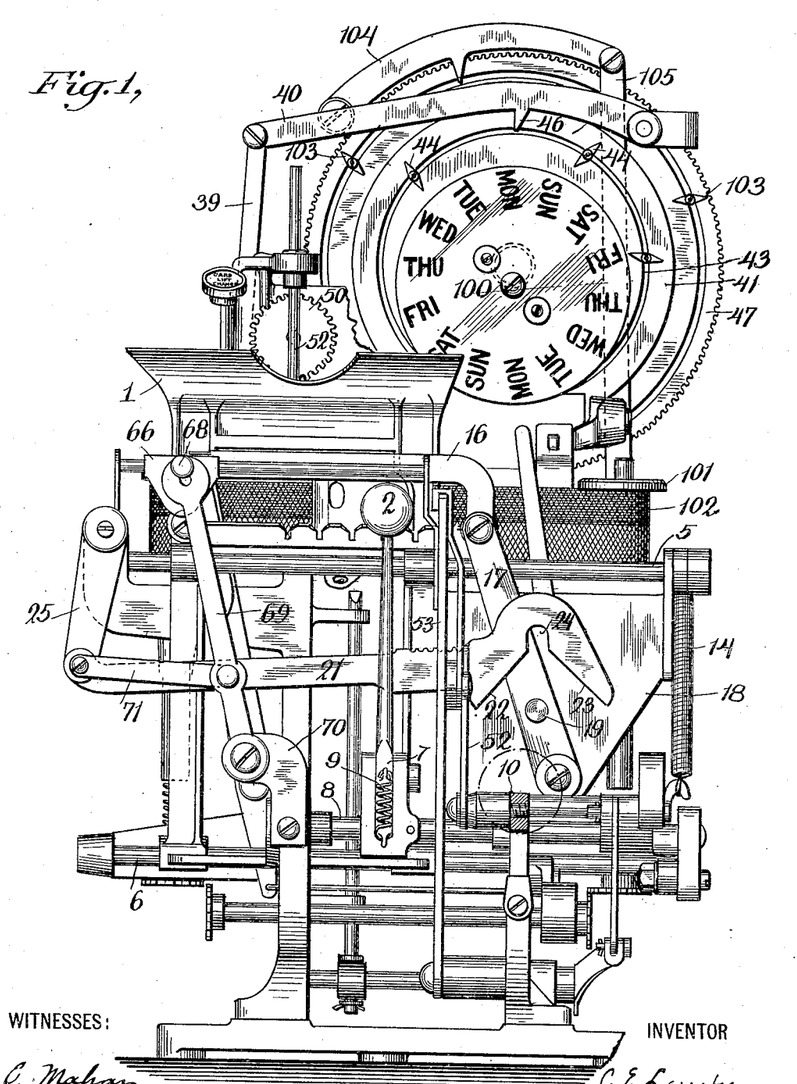
Figure 1 shows the apparatus in front elevation, without the clock and the usual inclosing casing.

The printing hammer is pivoted in a bifurcated arm 7 fast to a transverse shaft 8, and is normally held slightly retracted from contact with the record card (when the same is in the chute) by a spring 9, Fig. 1. Loose on the shaft 8 is the manual operating lever 10 which the operator actuates to effect a registration, and pivoted on said lever is a trip finger or pawl 11 arranged to engage a finger 12 rigidly mounted on shaft 8. Fast to the same shaft is an arm 13, connected to a spring 14 which urges the shaft in the clockwise direction (as viewed in Figs. 3 and 4) and hence tends to carry the hammer 2 toward the card-receiver.

Figure 4:
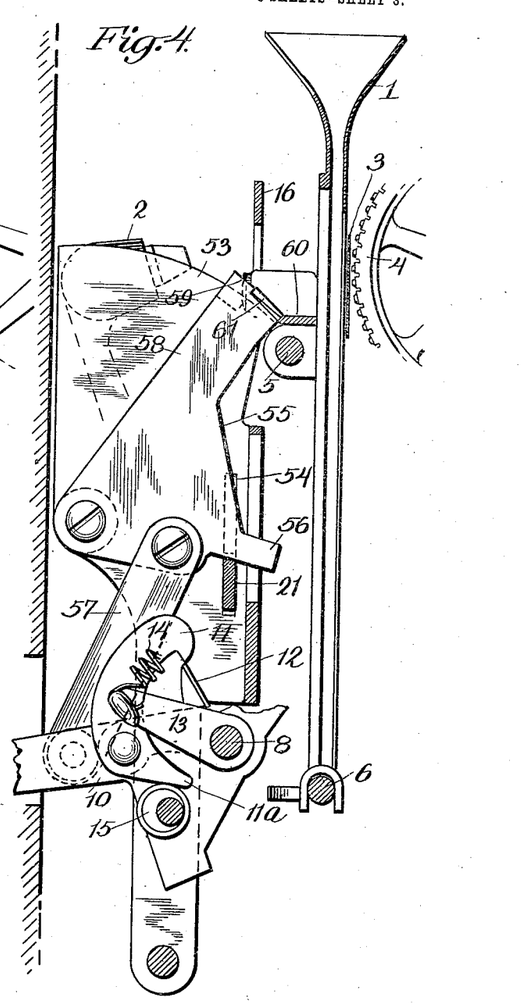

From the foregoing it will be seen that on depressing the lever 10 the pawl or hooked finger 11, engaging the finger 12, will retract the same, thereby rocking the shaft 8 and retracting the printing hammer, as shown in Fig. 4. As the operating lever descends, the depending end 11ª of the hooked finger or pawl 11 engages a cam-stop 15, on a fixed part of the apparatus, with the result that the pawl is lifted out of engagement with the finger 12, as is clearly shown in Fig. 4; whereupon the spring 14 acts to rock the shaft 8 and throw the printing hammer against the printing devices. Having struck its blow the hammer is caused to rebound by the spring 9. On release of the operating lever 10 it is raised to its normal position by a suitable spring (not shown), and the hooked pawl 11 rides over the finger 12, as shown in Fig. 3.

Figure 5:
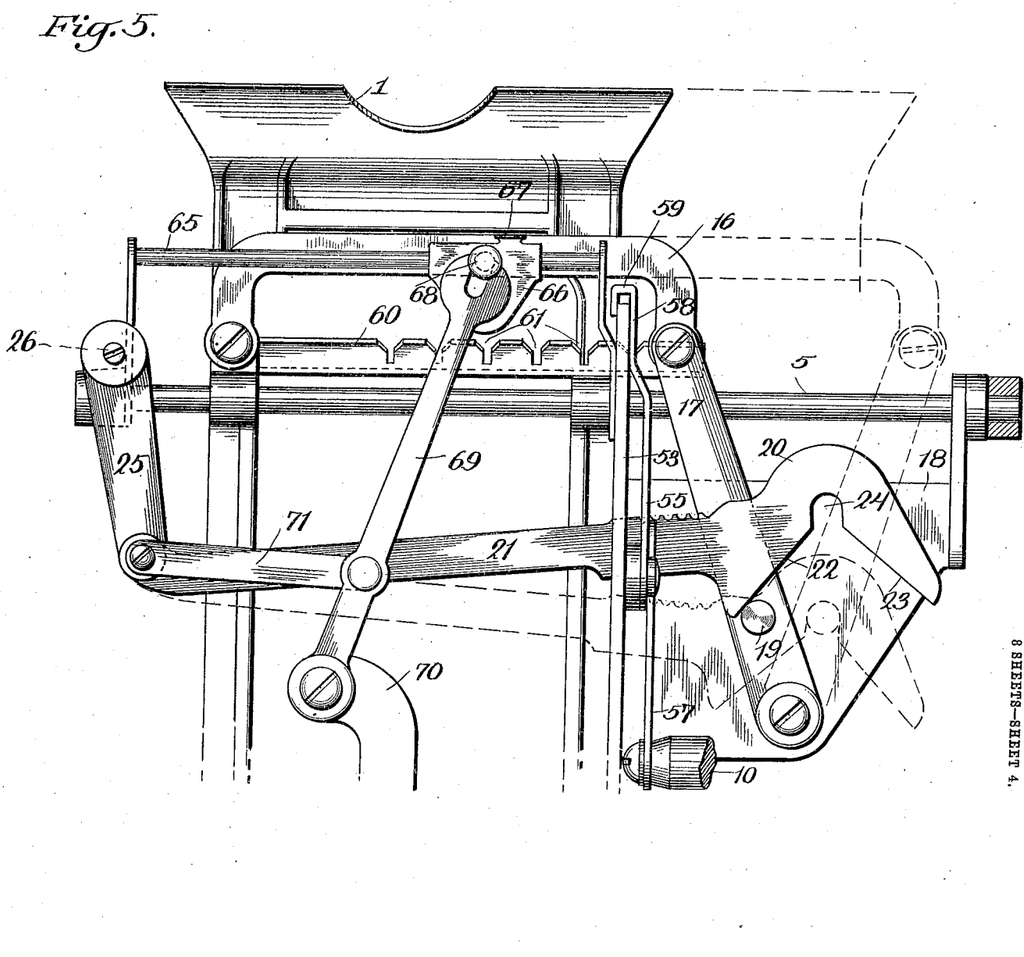
Fig. 5 is a detail front view showing different operative positions of the member which shifts the card-receiver.

For the purpose of adjusting the receiver laterally it is connected by a link 16, Fig. 5, arching over the printing hammer, to an arm or lever 17 pivoted at its lower end to a fixed plate 18. On the arm near its pivoted end is a stud 19, and immediately above the stud is the end 20 of a horizontally extending member 21, which is adjustable longitudinally for the purpose soon to be explained. The end 20 of said member is provided with a downwardly open V-shaped notch having oppositely inclined edges 22, 23, and terminating at its apex in a slot 24 adapted to fit the stud 19. Assuming the parts to be in the position shown in Fig. 1, it will now be clear that if the member 21 be shifted to the right and its end 20 depressed, the edge 22, engaging the stud 19, will carry arm 17 to the right and with it the receiver 1 until the slot 24 engages the stud, as shown in dotted lines in Fig. 5. Moreover, it is evident that if the receiver had previously been moved to the right far enough to bring the shifting stud 19 under the inclined edge 23 the arm 17 would, on depression of the member 20—21, be carried leftward and with it the receiver. It will therefore be seen that no matter in what position the receiver may be, the member 20—21 will, when depressed, shift the receiver and locate it in a position corresponding to the adjustment of said member. From this function the member 20—21 may be conveniently termed the locating member or bar. Said member is normally held in its raised position by a spring 21ª, Figs. 2 and 6.

Figures 6, 7:
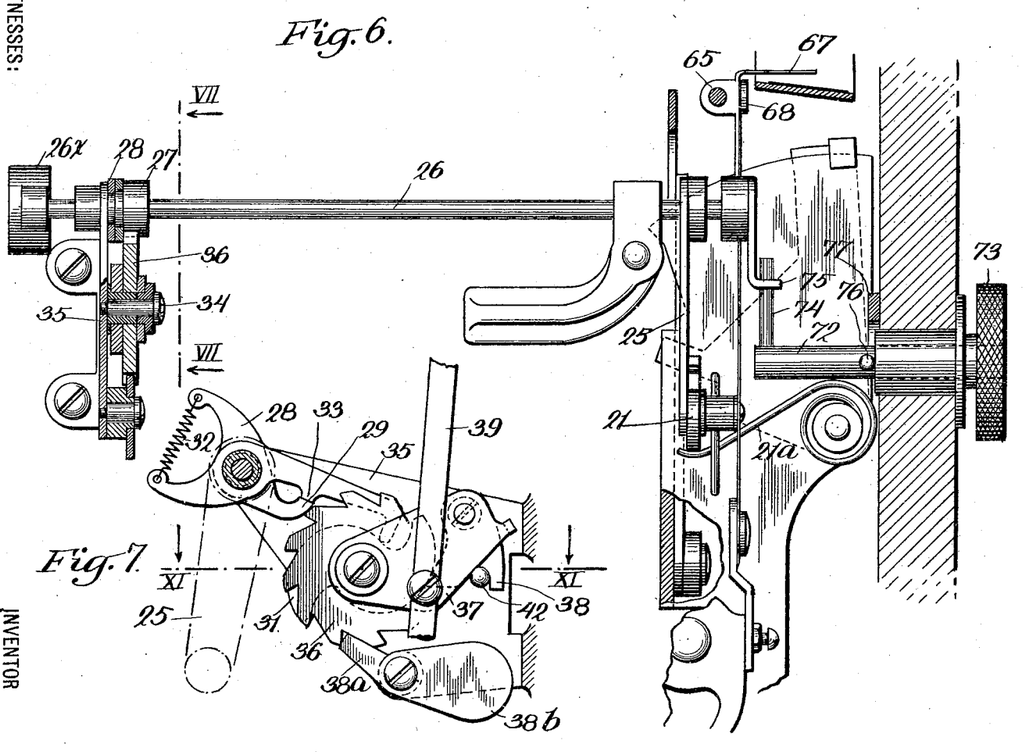
Fig. 6 is a detail side view showing the mechanism for setting the member which shifts the card receiver.
Fig. 7 is a section on line VII—VII of Fig. 6.
Figures 12, 13, 14, 15:
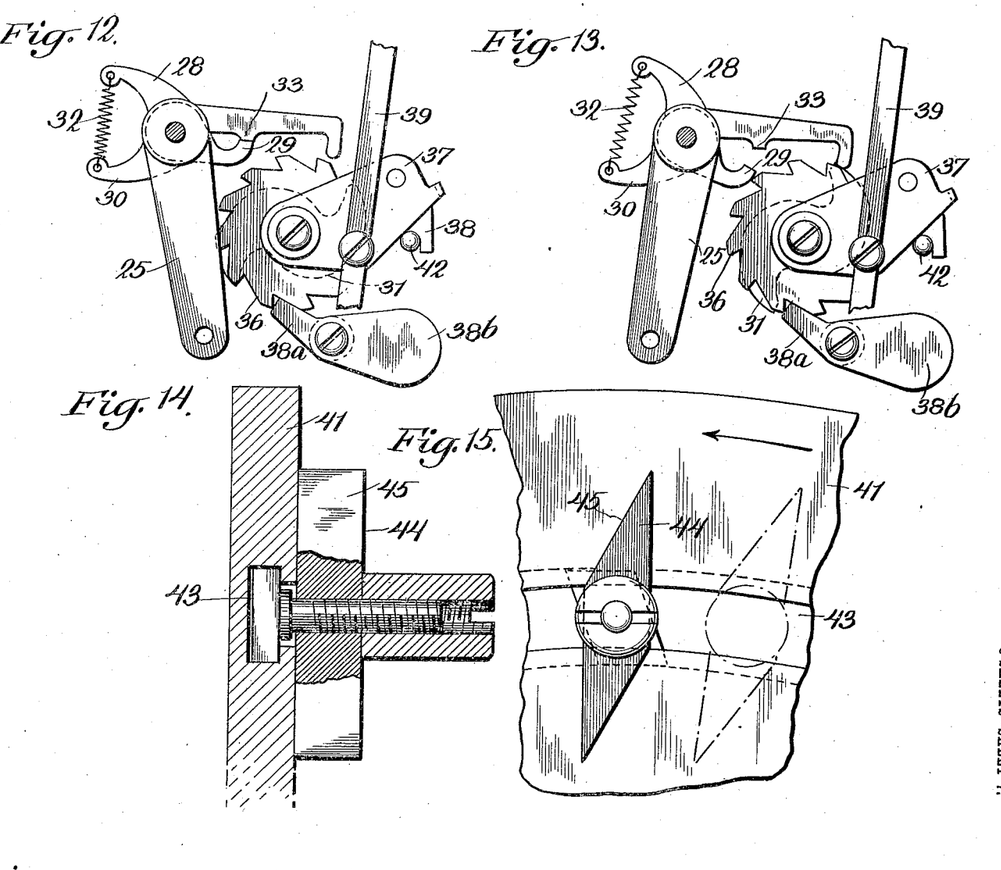
Figs. 12 and 13 are detail views showing different operative positions, under manual actuation, assumed by certain parts which, normally actuated by the clock, determine the position of the receiver-shifting member.
Figs. 14 and 15 are detail views showing the devices by which the clock acts to set the receiver-shifting mechanism.
Figure 18:
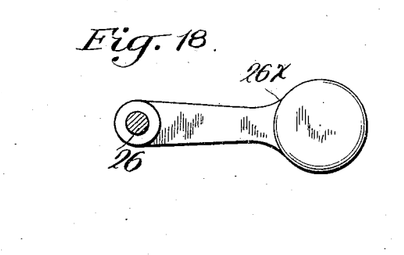
Figs. 18 and 19 are detail views of certain parts associated with the receiver-shifting mechanism.

For the purpose of adjusting the locating bar to right or left as desired, it is pivotally connected at its left end to an arm 25 fast to a rearwardly extending rock-shaft 26. At the rear end of the shaft (see Figs. 2, 6, and 7) and rigidly connected thereto is a sleeve 27, and fast to the sleeve is a lever 28, one end of which is formed as a stop, 29. Loose on the sleeve, alongside of the first lever, is a second lever, 30, having one end engaging a cam 31 and its other end connected to lever 28 by a coil spring 32, serving, as will be readily understood, to hold the lever 30 in yielding engagement with the cam, and with the projection 33 resting on the stop-end 29 of lever 28, as shown in Fig. 7. The cam is rotatably supported by a stud or short spindle 34 on a fixed plate 35, and it will be seen that as the cam rotates (clockwise as viewed in Fig. 7) the lever 30 will be rocked, carrying with it, through the medium of spring 32, the lever 28 and thereby rocking the shaft 26 counterclockwise. This movement of the shaft is counterclockwise as viewed in Figs. 1 and 5, and hence causes rightward movement or adjustment of the locating bar 21. It will also be evident that by suitable independent means the shaft 26 can be rocked in either direction, since movement clockwise (as viewed in Fig. 7) will separate the levers 28, 30, as shown in Fig. 13, while movement counterclockwise will simply lift the lever 30 off the cam, as shown in Fig. 12. Thus by rotating the cam from the clock the shaft 26 will be rocked and the card-receiver shifted at predetermined intervals; while by means independent of the cam the shaft can be rocked and the receiver adjusted to any position at any time. It will of course be understood that the position taken by receiver when adjusted by the cam depends upon the configuration and size thereof and the proportions of the associated parts. In the device illustrated the cam has two blades or arms, as shown, with the result that in each semi-revolution of the cam the locating bar 21 will be shifted as far to the right as the cam can throw it, and will be returned to its initial position when the lever or wiper 30 drops off the cam-blade to the position shown in Fig. 7; such return of the locating bar being effected by a weighted arm 26$^\times$ (Figs. 6 and 18) on shaft 26.

Figure 11:
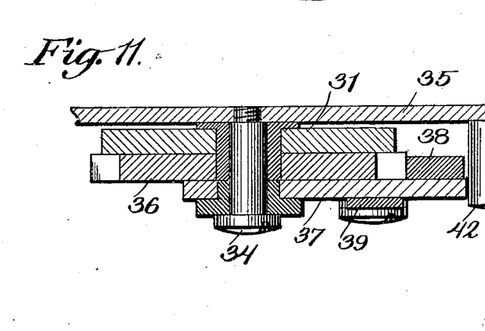
Fig. 11 is a section on line XI—XI of Fig. 7.
Figure 19:
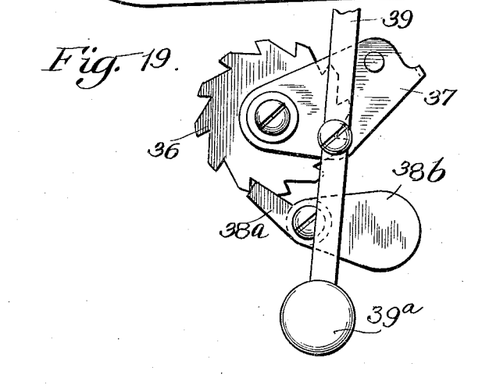

The rotation of the cam by the clock is effected by the following instrumentalities. Rigidly connected to the cam, on the same shaft or spindle, is a ratchet wheel 36, (Figs. 6, 7, and 11) the number of whose teeth determines the number of steps taken by the locating bar (and hence the card-receiver also) in the rightward movement thereof. Thus the ratchet illustrated has twelve teeth, six for each arm of the cam; hence at each movement of the ratchet corresponding to one tooth the locating bar will be shifted to the right a distance depending upon the size and shape of the cam, and, after five such adjustments have been effected the next or sixth movement of the ratchet will carry the cam-arm out of engagement with the wiper or lever 30, as shown in Fig. 7, and restore the locating bar to its initial position. At this position of the bar the card-receiver, when the bar is depressed, will be brought to its first position, for printing "Morning in", that is, the time of arrival in the morning. The other five steps provide for "Noon out", "Noon in", "Night out", and (for use in case the operator returns for work at night "Extra in" and "Extra out". Pivoted alongside of the ratchet is a pawl-carrier 37, on which is pivoted a pawl 38 in position to engage the ratchet. The pawl-carrier is itself connected by a link 39 to a lever 40 (Fig. 1) pivoted at the right of the machine adjacent to a time-setting wheel 41. Thus at each upward movement of the lever 40 the pawl and its carrier will be raised, retracting the pawl over a tooth; and at each downward movement of the lever the pawl will advance the ratchet a distance depending upon the location of the stop 42 with which the pawl engages; the location of the stop in the present instance being such that with an upward movement of lever 40 sufficient to carry the pawl backward over one tooth the downward movement of the pawl will rotate the ratchet through an arc equal in extent to one tooth. To give the movement of pawl 38 sufficient force to actuate the ratchet with certainty the lower end of link 39 may be provided with a weight 39$^a$, Fig. 19, and to hold the ratchet against possible reverse movement during retraction of the pawl 38, a holding pawl 38$^a$ is provided, pivoted on the plate or bracket 35 and maintained in engagement with the ratchet by its weighted end 38$^b$.

The time-setting wheel 41 has an undercut circular recess or slot 43 (see Figs. 1 and 15), and adjustably mounted in the slot is a series of lifters 44, each having an inclined cam face or edge 45 to engage the correspondingly inclined face of a lug or projection 46 on lever 40. Hence as the wheel rotates (counterclockwise as viewed in Fig. 1) each lifter engaging the lug will lift the lever 40 a distance depending, in general, on the size and relative proportions of the parts and on the position of the lug on its lever. In the machine illustrated it is intended that each upward movement of the lever will be sufficient in extent to retract the pawl 38 past one tooth on the ratchet.

Rigidly connected with the time-setting wheel 41 is a gear 47 in mesh with a pinion 48 fast to a shaft 49 which also has fast to it a gear 50. The latter meshes with a pinion 51 on a vertical shaft 52 connected by any suitable means (not shown) to the clock so as to be rotated thereby. It will therefore be seen that the time-setting wheel 41 will be driven by the clock, at a rate dependent, for a given rate of rotation of shaft 52, upon the proportions of the gears and pinions just mentioned, in accordance with the well understood principles of toothed gearing. Thus the time-setting wheel may be made to rotate at any convenient rate. In the machine illustrated, in which the cam 31 has two arms, the wheel 41 revolves once in twenty-four hours, and hence six lifters are employed, (only three being shown) arranged so as to lift the lever 40 at the times at which an adjustment of the locating bar 21 is desired. Of course the wheel may revolve at practically any desired rate, the number and positions of the lifters being varied accordingly, as will be readily understood.

The locating bar 21 is depressed by the devices now to be described. Fixed alongside of the printing hammer 2 is a vertical frame-plate 53 (Figs. 1, 2, 3 and 4), having a vertical slot 54 in which the locating bar moves. Pivoted to the frame-plate is an actuating plate 55, provided with a rearwardly extending finger 56 projecting over and engaging the locating bar. The actuating plate is connected to the main operating lever 10 by a link 57, so that as the lever is depressed to effect a time registration the plate 55 will be swung rearwardly, thereby carrying the finger 56 downward and depressing the locating bar. Remembering that the printing hammer is not tripped or released to strike its blow until the main operating lever is fully depressed, as shown in Fig. 4, it will be seen that by that time the locating bar will likewise be fully depressed, as in the figure just mentioned, and the card-receiver located in adjusted position. Thus at each printing operation the receiver is first brought to the position of adjustment corresponding to the position of the locating bar, which latter is of course, in the normal operation of the machine, set by the clock.

Extending slightly above the frame-plate 53, the top of which is arc-shaped with its center of curvature at the pivot of the actuating plate 55, is an extension 58 of the actuating plate, having a guide finger 59 embracing said arc-shaped top. Fixed to the card-receiver 1 is plate 60, having its forward part bent upward and provided with a series of flaring notches 61, six in number, arranged in correspondence with the six positions of the receiver. When the actuating plate 55 is depressed, the end of the extension 58 enters the notch which has been presented thereto by the movement of the receiver through depression of the locating bar. If for any reason the fit between the stud 19 on arm 17 and the slot 24 in the locating bar should not be close, and the receiver therefore not accurately in position, the locking extension 58, striking one or the other inclined side of the notch in plate 60, cams the receiver into the exact position required, as will be readily understood.

Figure 10:
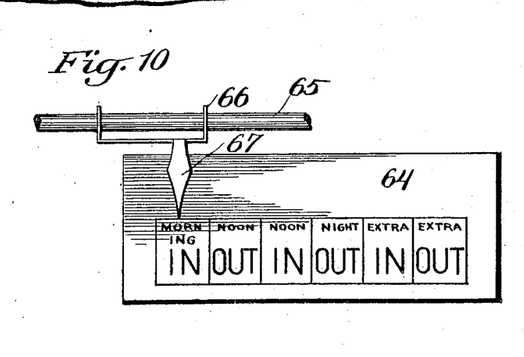
Fig. 10 is a detail view of the devices for indicating the position of the card receiver.

Under a window 62 (see Fig. 2) in the casing 63 in front of the card-receiver is an indicator plate 64 bearing the designations "In", "Out", etc., as shown in Fig. 10. Sliding on a rail 65 arranged parallel with the path of the card-receiver is an index carriage 66 having an index 67 extending over the indicator plate. On the front of the carriage is a stud, 68 engaging the slotted end of an arm or lever 69 (see Figs. 1 and 5) pivoted at its lower end to a fixed member 70 and pivoted intermediate of its ends to a link 71. The latter is connected to the pivotal connection between the locating bar 21 and its adjusting arm, so that as said arm is swung by the rocking of shaft 26 as previously described, the lever 69 will be swung in correspondence therewith and carry the index 67 over the proper designation on the indicator plate 64, thus indicating to the operator the position which the card-receiver will take when he depresses the printing or main operating handle 10.

Figure 8:
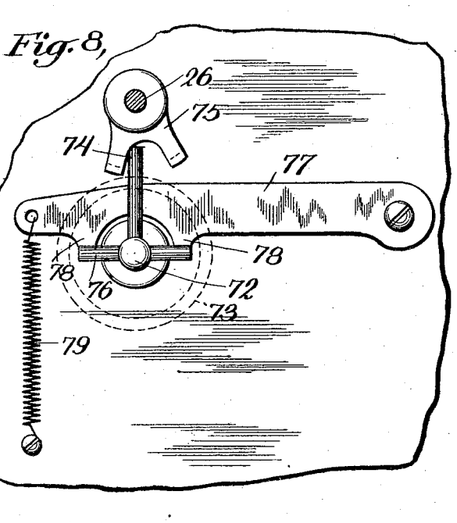
Figs. 8 and 9 are detail views of the mechanism for manually setting the member which shifts the card-receiver.
Figure 9:
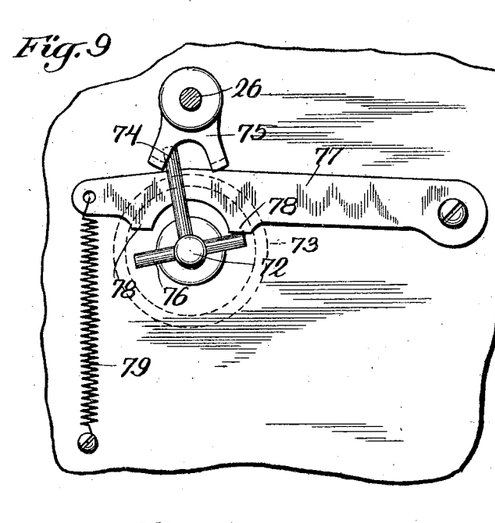

As before stated, the locating bar 21 can be adjusted at will independently of the clock-driven cam 31. For this purpose the following devices are provided. Rotatably mounted in the front of the casing 63 is a short shaft 72 (Figs. 6, 8 and 9) having on its outer end a manual operating knob 73 and on its inner end an upwardly extending pin 74. The latter extends between the forks of a bifurcated plate 75 fixed on the adjacent end of shaft 26, and it will therefore be evident that if the knob be turned clockwise (as viewed from the front of the machine, or counterclockwise as viewed in Fig. 8) the pin 74 will strike a fork of the plate 75, swinging the same to the left (as viewed in Fig. 8) and rocking the shaft 26 correspondingly. The locating bar 21 is thus carried to the right of the machine; and, as will be readily understood, turning the knob in the direction opposite to that mentioned above will cause the locating bar to be retracted. Since the index 67 follows the movement of the locating bar to right and left, the operator can easily set the mechanism to bring the card-receiver to any position desired. For example, a workman leaving early in the afternoon, may find the index standing over "Noon in", thus showing that the impression would be made in the "Noon in" space, which he had of course filled when he came back to work after his noon meal. He therefore turns the setting knob 73 until the index points to the requisite out space, and then actuates the lever 10, whereupon the record is made in the proper column on his card. In order to prevent the pin 74 interfering with the movement of shaft 26 by the clock, the shaft 72 is provided with a horizontally extending pin 76, and above the last mentioned shaft is a lever 77 having lugs 78 arranged to engage the opposite ends of pin 76. The lever is depressed by a coil spring 79. It will therefore be seen that normally the stops 78 will keep the pin 76 horizontal and hence maintain the pin 74 in its vertical position, as shown in Fig. 8, but by the yielding of spring 79 will permit the pin 74 to be thrown to either side by the actuation of shaft 72, as clearly illustrated in Fig. 9. On release of the shaft 72 the lever 77 promptly returns the pin 74 to its normal position.

Figure 16:
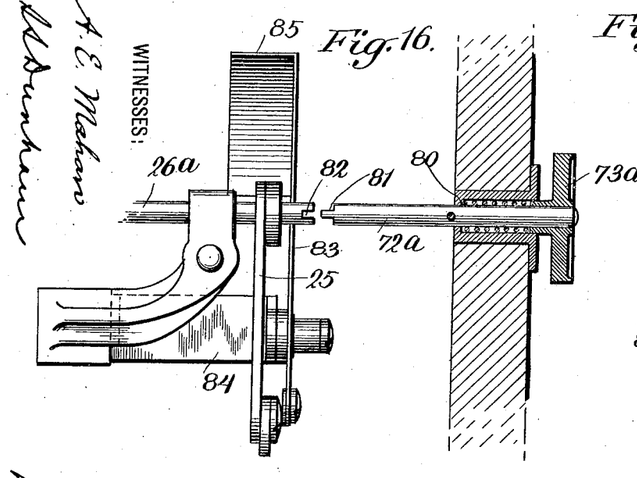
Figs. 16 and 17 are detail views of certain modifications of the indicating devices and the manual-setting mechanism.
Figure 17:
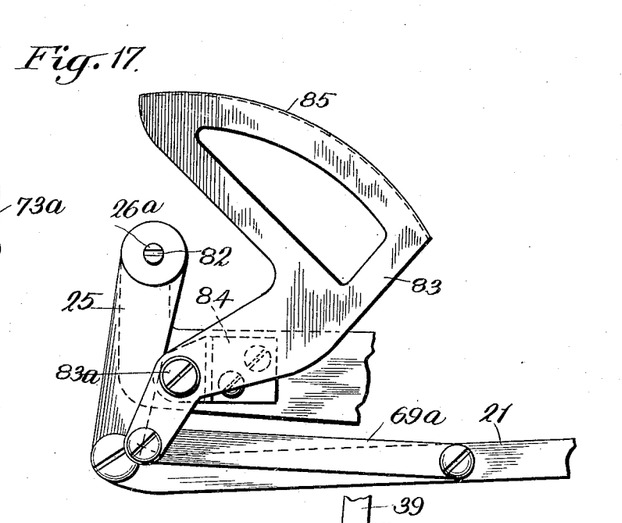

Figs. 16 and 17 show an alternative construction for the manual setting of the locating bar, and also an alternative form of indicating mechanism. In the former the shaft or stem 72ᵃ, corresponding to shaft 72 in Fig. 6, is also longitudinally movable in its bearings, but is normally held in its outermost or forward position by a spring 80. The rear end of the shaft has a flat stud 81, adapted to enter a corresponding slot 82 in shaft 26ᵃ (corresponding to shaft 26) when the stem 72ᵃ is pressed inward. The shaft 26ᵃ can thus be rocked in either direction; while on release of the knob 73ᵃ by the operator the spring 80 at once retracts the stem from engagement with the shaft.

In the modified indicating mechanism illustrated in Figs. 16 and 17, an indicating member 83 is provided, pivoted at 83ª on a bracket 84 and having its lower end, beyond the pivot, connected by the link 69ª to the locating bar 21. The top 85 of member 83 is arc-shaped, with its center of curvature at the pivot 83ª, and is arranged to sweep past a small window, not shown, in the casing of the machine as the link 69ª is actuated by the locking bar. On the curved top 85 are the usual "In" and "Out" designations, observable through the window to indicate to the operator the position of the card-receiver when he depresses the main operating lever, 10.

The operation of the various parts of the machine having already been described, a detail statement of the working of the apparatus is deemed unnecessary. Suffice it to say that at certain times during the day, determined by the position of the lifters 44 on the clock-driven time-setting wheel 41, the locating member or bar 20—21 is shifted to the right. Depression of the main operating lever 10 then retracts the printing hammer and at the same time draws down the locating bar thus causing it to cam the stud 19 on arm 17 into the notch 24 if said stud is not already in the path traversed by the notch. The movement of the arm 17, acting through the instrumentality of link 16, shifts the card-receiver to the proper position for printing in the proper in or out column as the case may be. Further downward movement of the main operating lever now releases the printing hammer, which, under the influence of its spring 14, is thrown against the record card and carries the same against the ink-ribbon and type-wheels. If for any reason it is desired to shift the card-receiver to a position different from that to which it would be brought by the locating bar as the same stands at the time, the knob 73 is turned by the hand in one direction or the other, as may be necessary, thereby swinging the arm 25 and effecting a corresponding adjustment of the locating bar independently of the clock-driven mechanism, so that depression of the operating lever will cam the receiver to the new position. On release of the knob 73 and lever 10 the locating bar is automatically restored to the control of the clock and returned to its last clock-adjusted position.

As previously stated, in time-recorders of the type illustrated, the day-line which will be presented to the impression point depends upon the depth to which the card is inserted in the receiver, and this depends upon the position of the bottom of the receiver, known in the art as the "abutment" or "card-lift", which is vertically adjustable. This abutment (not shown) is operated by suitable time-controlled mechanism, but as the same forms no part of my present invention, description thereof is deemed unnecessary, particularly as devices for the purpose are well known in the art. The particular day-line which is at the impression point is indicated by an indicator disk 100 in the usual way. It is also customary, in time-recorders of this kind to provide for printing "irregular" registrations, for example tardy arrivals and early departures, in a color contrasting with that in which "regular" records are printed. For this purpose the ink-ribbon spools 101, which carry the two-color ribbon 102, are adjustable vertically by suitable mechanism (not shown) actuated by lifters 103 on the wheel 47, similar to those employed on the time-setting wheel 41. These lifters 103 at the proper times raise a lever 104 operatively connected with the said mechanism by a link 105.

It will be apparent to those skilled in the art that the invention may be embodied in various forms other than herein specifically illustrated and described, and the details of construction may be varied widely without departure from the proper scope of the invention as defined by the appended claims.

What I claim is:

1. In a time-recorder, the combination of a record-receiver adjustable with respect to the impression point; a locating member adjustable independently of said receiver, for shifting the receiver to a position determined by the adjustment of said member; and time-controlled mechanism for adjusting the locating member; as set forth.

2. In a time-recorder, the combination of a record-receiver adjustable with respect to the impression point; an adjustable locating member normally disconnected from the receiver; time-controlled mechanism for adjusting said locating member; and means for connecting said member with the receiver at will to shift the receiver to a position determined by the adjustment of the member; as set forth.

3. In a time-recorder having time-printing devices, the combination of a record-receiver adjustable with respect to the impression point; means for taking impressions from the time-printing devices upon a record-surface carried by the receiver; mechanism actuated by said impression-taking means for positioning the receiver at each impression-taking operation and in advance thereof; and time-controlled devices acting on said mechanism to determine the position to be taken by the receiver when said receiver-positioning mechanism is actuated; as set forth.

4. In a time-recorder, the combination of a record-receiver adjustable with respect to the impression point; a manually actuated operating lever; mechanism actuated by said lever for positioning the record-receiver; and time-controlled devices acting on said mechanism to determine the position to be taken by the receiver when said mechanism is actuated; as set forth.

5. In a time-recorder, the combination of a record-receiver adjustable with respect to the impression point; adjustable means for positioning said receiver according to the adjustment of said means; time-controlled mechanism for adjusting said means; manually actuated devices for adjusting said means independently of the said time-controlled mechanism; and a manual lever for effecting the printing of the time-records, operatively connected with said receiver-positioning means to actuate the same, whereby said receiver will be positioned at each time-recording operation; as set forth.

6. In a time-recorder, the combination of a record-receiver adjustable with respect to the impression point; a locating member for positioning the receiver; a clock-driven cam for adjusting said member to determine the position to be taken by the receiver; and means for adjusting said locating member independently of said clock-driven cam; as set forth.

7. In a time-recorder, the combination of a record-receiver adjustable with respect to the impression point; a manually actuated locating member for positioning the receiver when said member is actuated; a cam for adjusting said member to determine the position to be taken by the receiver; a ratchet connected with the cam; and a clock-actuated pawl for actuating the ratchet; as set forth.

8. In a time-recorder, the combination of a record-receiver adjustable with respect to the impression point; manually actuated mechanism for positioning the receiver; means for setting said mechanism to determine the position to be taken by the receiver when said mechanism is actuated; a lever connected with said setting means to actuate the same; a clock-driven setting wheel; and means carried by the said clock-driven wheel for actuating said lever at predetermined intervals; as set forth.

9. In a time-recorder, the combination of a record-receiver adjustable with respect to the impression point; a lever connected with the receiver to adjust the same; a locating member normally disconnected from but adapted to be connected with the lever to actuate the same; a rock-shaft connected with the locating member to adjust the same, to determine the position to be taken by the receiver when the locating member actuates the said lever; and time-controlled mechanism for rocking said shaft at predetermined intervals; as set forth.

10. In a time-recorder, the combination of an adjustable record-receiver; mechanism, including a rock-shaft, for positioning the receiver with respect to the impression point; a lever on the rock-shaft; a cam engaging the lever to actuate the same and rock the shaft; and time-controlled means for actuating the cam; as set forth.

11. In a time-recorder, the combination of an adjustable record-receiver; mechanism, including a rock-shaft, for positioning the receiver with respect to the impression point; a lever on the rock-shaft; a cam engaging the lever to actuate the same and rock the shaft; time-controlled means for actuating the cam; and manually operated means for rocking said shaft independently of said cam; as set forth.

12. In a time-recorder, the combination of an adjustable record-receiver; mechanism including a rock-shaft, for positioning the receiver with respect to the impression point; a pair of levers on the shaft, one loosely mounted on the shaft and the other fixed thereto; yielding means connecting said levers for holding the same yieldingly in fixed relation to each other; a cam engaging the loosely mounted lever to rock the same; time-controlled mechanism for actuating the cam; and manually operated means for rocking said shaft, such movement being permitted by the yielding means connecting the aforesaid levers; as set forth.

13. In a time-recorder, the combination of an adjustable record-receiver; time-controlled mechanism for positioning the receiver with respect to the impression point, said mechanism including a rock-shaft capable of movement independently of the rest of the said mechanism; a forked member on said shaft; and a manually actuated shaft having a finger extending between the forks of said member; as set forth.

14. In a time-recorder, the combination of an adjustable record-receiver; a rock-shaft; means connected therewith for positioning the receiver with respect to the impression point; time-controlled means for actuating the shaft; and manual means for actuating the shaft, comprising a forked member on the shaft, a shaft having a finger extending between the forks of said member, and yielding means normally holding the last named shaft with its finger positioned centrally with respect to the said forks; as set forth.

15. In a time-recorder, the combination of an adjustable record-receiver; a lever connected with the receiver to adjust the same; a locating member adjustable with respect to said lever, normally disconnected therefrom but adapted when actuated to engage the lever and swing the same; time-controlled mechanism for adjusting the locating member; and manually operated means for actuating said member; as set forth.

16. In a time-recorder, the combination of an adjustable record-receiver; a lever connected therewith to adjust the same; a locating bar having a cam-portion adapted to engage the lever to actuate the same; means for adjusting the locating member with respect to the lever; and means for actuating the locating member to cause the same to engage the lever and position the card-receiver; as set forth.

17. In a time-recorder, the combination of an adjustable record receiver; a lever connected with the receiver to adjust the same and provided with a stud; a locating member to actuate said lever, said member having a cam-notch and being arranged with said notch adjacent to but spaced from the stud on said lever; means for actuating the locating member to engage the stud in said notch; and means for adjusting the locating member, to determine the direction and extent of movement of said lever when actuated by the locating member; as set forth.

18. In a time-recorder, the combination of a record-receiver adjustable horizontally past the impression point; a lever connected with the receiver to actuate the same, and provided with a stud; a horizontally arranged locating bar pivotally supported at one end and having at its other end a cam-notch for engaging the lever-stud when the bar is actuated; means for actuating the bar; and means for adjusting the bar longitudinally; as set forth.

19. In a time-recorder, the combination of an adjustable record-receiver; a manually actuated locating member adapted when actuated to position said receiver for printing from any point in its line of travel; time-controlled mechanism for adjusting said member to determine the position to be taken by the receiver when said member is actuated; manually operated means for adjusting said member at will independently of the time-controlled mechanism; and indicating devices connected with the locating member to indicate the position to be taken by the receiver when said member is actuated, as set forth.

20. In a time-recorder, the combination of an adjustable record-receiver; a locating member; means actuated by said member for positioning the card-receiver with respect to the impression point; a spring-actuated printing hammer; manually operated mechanism for retracting the printing hammer; means for releasing the printing hammer from said mechanism after the hammer is retracted; and means connected with said mechanism, for actuating the locating member during retraction of the printing hammer; as set forth.

CLINTON E. LARRABEE.

Witnesses:
HARLOW E. BUNDY,
A. WARD FORD.